United States Patent [19]
Morgan

[11] Patent Number: 5,421,187
[45] Date of Patent: Jun. 6, 1995

[54] CALIBRATION OF AN INTERNAL SENSOR SYSTEM

[75] Inventor: Avery A. Morgan, St. Petersburg, Fla.

[73] Assignee: Honeywell Inc., Minneapolis, Minn.

[21] Appl. No.: 174,114

[22] Filed: Dec. 28, 1993

[51] Int. Cl.$^6$ .............................................. G01C 17/38
[52] U.S. Cl. ........................................ 73/1 D; 73/1 B; 73/504
[58] Field of Search ......................... 73/1 D, 1 B, 504

[56] References Cited

U.S. PATENT DOCUMENTS

| | | | |
|---|---|---|---|
| 3,583,205 | 6/1971 | Erle | 73/1 D |
| 4,275,605 | 6/1981 | Kennel | 73/504 |
| 4,448,377 | 5/1984 | Shinkle | 248/178 |
| 4,625,426 | 12/1986 | Hunter | 73/1 D |

Primary Examiner—Richard E. Chilcot, Jr.
Assistant Examiner—Max H. Noori
Attorney, Agent, or Firm—Thomas A. Rendos

[57] ABSTRACT

A calibration device for establishing a 3-D reference frame for an inertial sensor system. A secondary mounting surface on the calibration device is used to provide a measurement of the reference line required for inertial system installation alignment. This device provides a means for establishing a highly accurate alignment of inertial system sensors relative to the output coordinates, called the "mounting frame", without a requirement for optics or a manual transfer of data. By rotating the inertial sensor system through use of a rate table into planes which are substantially perpendicular to each other, the mounting frame for the sensor system can be established.

10 Claims, 6 Drawing Sheets

CALIBRATION OF AN INTERNAL SENSOR SYSTEM

FIELD OF THE INVENTION

This invention relates to a calibration device and more specifically to a device which is used to calibrate inertial sensor systems which are used in navigation or target tracking.

BACKGROUND OF THE INVENTION

Inertial sensor systems or inertial navigation units generally include inertial sensors such as accelerometers and gyroscopes, i.e., gyros. The sensors are generally rigidly and precisely mounted within an enclosure along with related electronics and hardware. In turn, the enclosure is rigidly and precisely mounted to a support frame in a vehicle, such as an aircraft, missile, or satellite. Precision mounting of these components is required so that the alignment of the sensor relative to the support frame as well as the enclosure is known, and the sensor outputs are utilized by a system computer as is well known in the art.

The sensor system generally includes a plurality of inertial sensors and a navigational computer. The inertial sensors provide inertial data, such as linear acceleration and rotational velocity or angular information, to the navigational computer which processes the information for a variety of purposes such as flight control, navigation or pointing. For proper performance of a sensor system, the geometrical relationship between each of the inertial sensors must be known, and the relationship between each of the inertial sensors and the vehicle support frame must also be known so that the navigational computer may provide a user with correct information.

Inertial systems data, measured along the input axes of the gyros and accelerometers must be compensated and transformed to coordinates defined by the ultimate user of the sensor system. For optimum performance of inertial sensor systems, precise alignment or orientation of the inertial sensors relative to the vehicle must be known and held to tight tolerances. Most vehicles are provided with a shelf or rack which allows for installation of the sensor systems according to reference edges or surfaces on the enclosure. For example, with a reference surface on the enclosure as well as a reference edge defined, a 3-D axis system can be determined for the inertial sensor system which is transferable to the vehicle. However, before the inertial sensor system can be installed on a vehicle, a 3-D reference system must be established between the exterior of the enclosure and the sensors themselves.

The output data reference frame of the sensors with respect to the enclosure is called the "mounting frame", or M-frame. The definition of the M-frame varies greatly between applications, and is often overlooked until late in the design, or is specified in a casual and inadequate manner. The reason for the difficulty is that the mounting reference involves both the inertial sensor enclosure design, as well as the equipment in which the inertial sensor system is to be installed.

In the past, an M-frame was established through some sort of optical reference, such as an optical cube, mirrors, or a combination of a mirror and a porro prism. The disadvantage of using these optical methods is that surveying is required by both the inertial system manufacturer and the customer. High skill levels are required and the process is subject to error. The calibration must be checked and rechecked. Further, there are many situations in which an optical line-of-sight is not available.

Another approach is to use one mounting surface on the enclosure and a mirror as a reference. Although this reduces some of the complex optical measurements required, it does not eliminate them entirely. Therefore, it is the desire to establish a simpler procedure for calibrating an inertial sensor assembly while retaining a high level of accuracy.

SUMMARY OF THE INVENTION

The invention herein described is a calibration device for an inertial sensor system mounted within an enclosure. The calibration device is comprised of a primary mounting member having a primary mounting surface as well as a secondary mounting member with a secondary mounting surface. The secondary mounting surface is substantially perpendicular to the primary mounting surface. The enclosure for the inertial sensor system has a reference surface as well as a secondary surface used to define a reference edge. The enclosure is mounted on the calibration device with the reference surface flush against the primary mounting surface. Two points extend from the secondary mounting surface and contact the secondary surface of the enclosure to define the reference edge. Means are provided to hold the sensor assembly on the calibration device.

The calibration of the inertial sensor system is done through the use of a rate table. The enclosure is first mounted on the calibration device and then positioned on the rate table so that the turn axis of the table is perpendicular to the primary mounting surface. The calibration device and the enclosure mounted upon it are then rotated which establishes an X-axis for the inertial sensor assembly. The calibration device is then repositioned on the rate table so that the enclosure rotates about an axis perpendicular to the secondary mounting surface. This rotation establishes a directional vector whose cross product with the X-axis establishes a Y-axis for the inertial sensor system. The cross product of the already established X-axis and Y-axis determines the Z-axis for the inertial sensor system.

The present invention offers the advantages of a simple method and apparatus for establishing a mounting frame for an inertial sensor system. High accuracy is maintained without the use of complex optical surveying equipment.

DETAILED DESCRIPTION OF THE PREFERRED EMBODIMENTS

Figure 1:
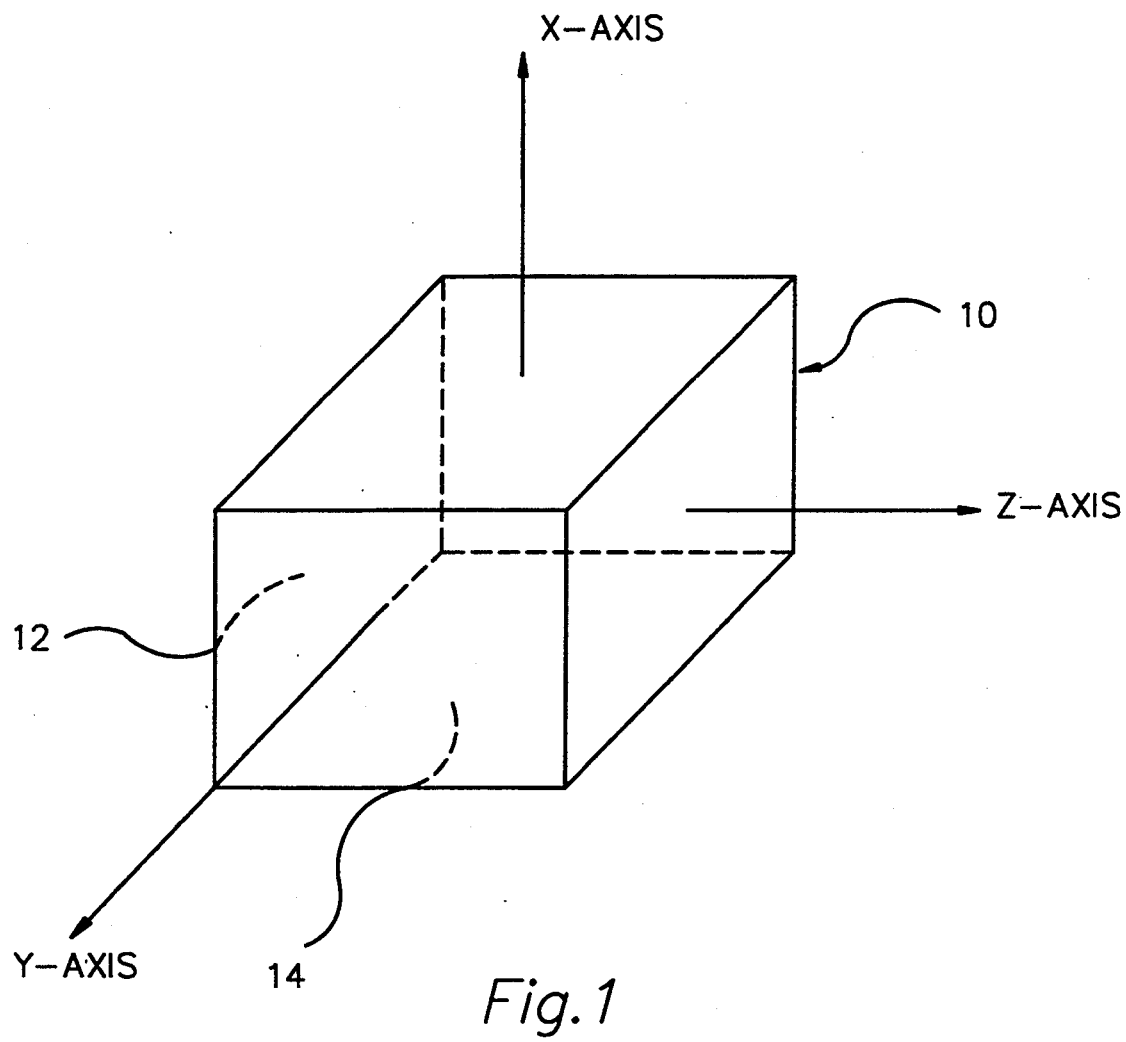
FIG. 1 is a diagrammatic representation showing the inertial reference axes of the inertial sensor assembly.

Shown in FIG. 1 is an isometric view of the inertial sensor assembly 10. Contained within the assembly are inertial sensors such as accelerometers or gyroscopes along with related electronics and hardware. The sensors provide inertial data, such as linear acceleration and rotational velocity or angular information to a computer which uses the information for a variety of purposes such as navigation, flight control, attitude reference, or target tracking support. When the sensor assembly is installed, the sensors within the enclosure must be oriented with respect to the vehicle in which the assembly is to be installed in order to provide meaningful output information. To make the assembly easily installable in a vehicle, the inertial sensors are calibrated with respect to exterior surfaces on sensor assembly 10. Once the sensor assembly is calibrated, mutually orthogonal reference axes are established for the assembly. These three axes are known as the mounting frame or M-frame. The mounting frame is established with respect to enclosure reference surface 12 and a reference edge parallel to enclosure secondary surface 14. In order to provide the mounting frame for inertial sensor assembly 10, a calibration procedure must be performed.

Figure 2:
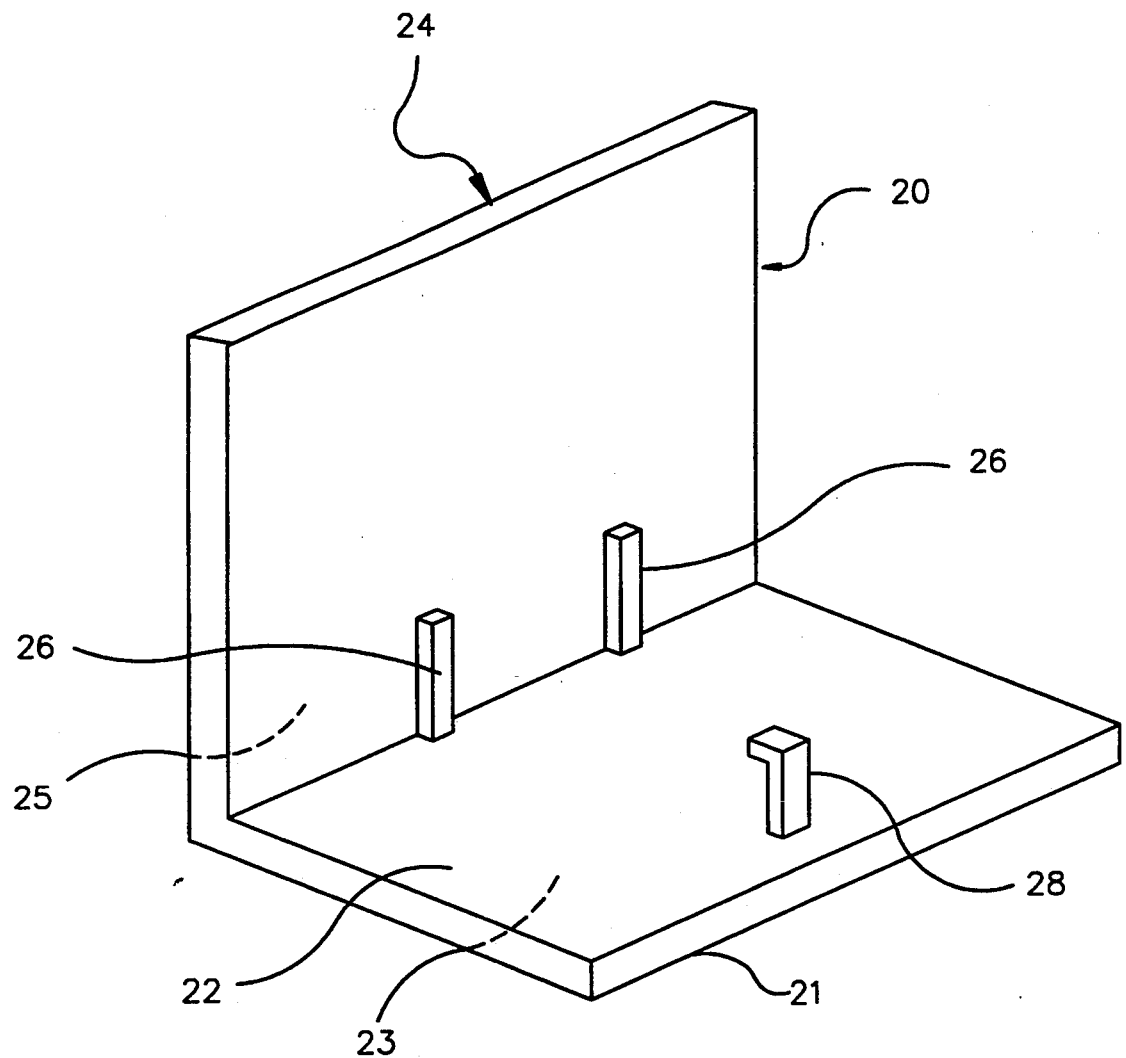
FIG. 2 is an isometric view of the first embodiment of the calibration device.

One way to perform the calibration procedure is through use of the calibration device 20 shown in FIG. 2. The calibration device is comprised of primary mounting member 21 and secondary mounting member 24. On primary mounting member 21 is primary mounting surface 22. Also on primary mounting member 21, parallel to primary mounting surface 22, is surface 23. On secondary mounting member 24 is secondary mounting surface 25 which is substantially perpendicular to primary mounting surface 22. Secondary mounting member 24 also includes reference edge protrusions 26 which are designed to make contact at two points with sensor assembly 10 when installed on calibration device 20. These two points of contact are called the reference edge points. The reference edge points are designed to be in a plane parallel to secondary mounting surface 25. The intersection between this plane and the primary mounting surface 22 is called the alignment reference line. Reference edge forcing device 28 is located on primary mounting surface 22 and provides a force in which to hold the sensor assembly 10 against reference edge protrusions 26 when it is positioned on calibration device 20.

Figure 3B:
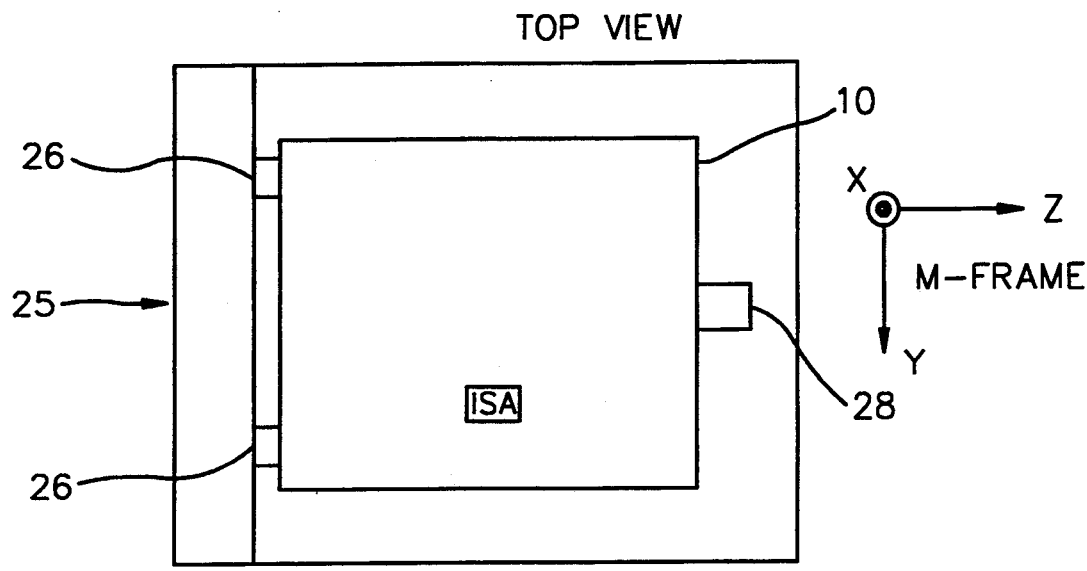
FIGS. 3a and 3b are views of the inertial sensor assembly mounted upon the calibration device.
Figure 3A:
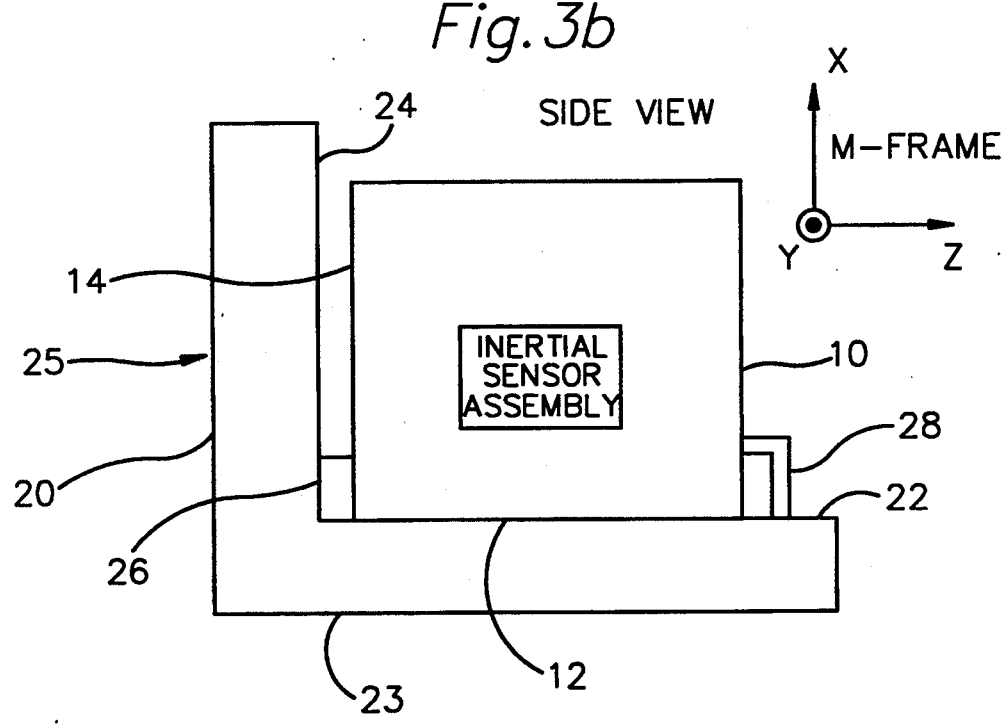

FIG. 3a and 3b show the inertial sensor assembly 10 mounted on calibration device 20. Enclosure reference surface 12 is flush against primary mounting surface 22 while the enclosure secondary surface 14 contacts the reference edge protrusions 26. Contact between reference surface 12 and primary mounting surface 22 is maintained by a fastening device (not shown). Contact between the reference edge protrusions 26 and enclosure secondary surface 14 is maintained through use of the reference edge forcing device 28. The attachment forces must be sufficient to overcome thermal and vibration effects, but must not cause adverse deformation of the inertial sensor assembly. The attachment means of the inertial sensor assembly 10 to the calibration device 20 is exactly the same as the attachment means of the inertial sensor assembly 10 to the vehicle support frame. With the inertial sensor assembly mounted on the calibration device, the actual process of calibration can then begin.

Figure 4B:
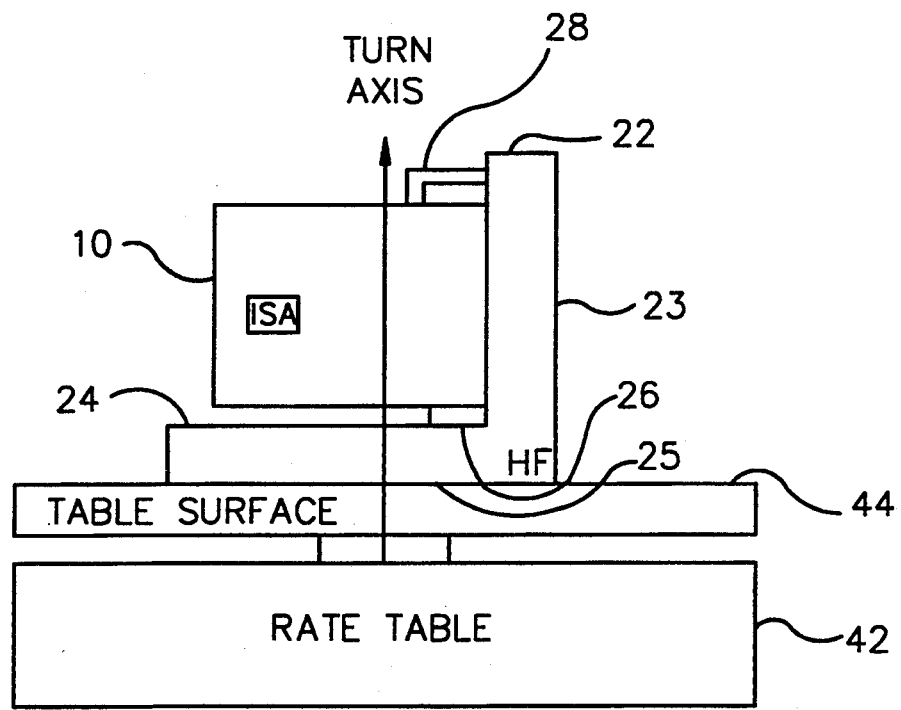
FIGS. 4a and 4b shows the calibration device and the inertial sensor assembly rotated about two perpendicular axes on the rate table.
Figure 4A:
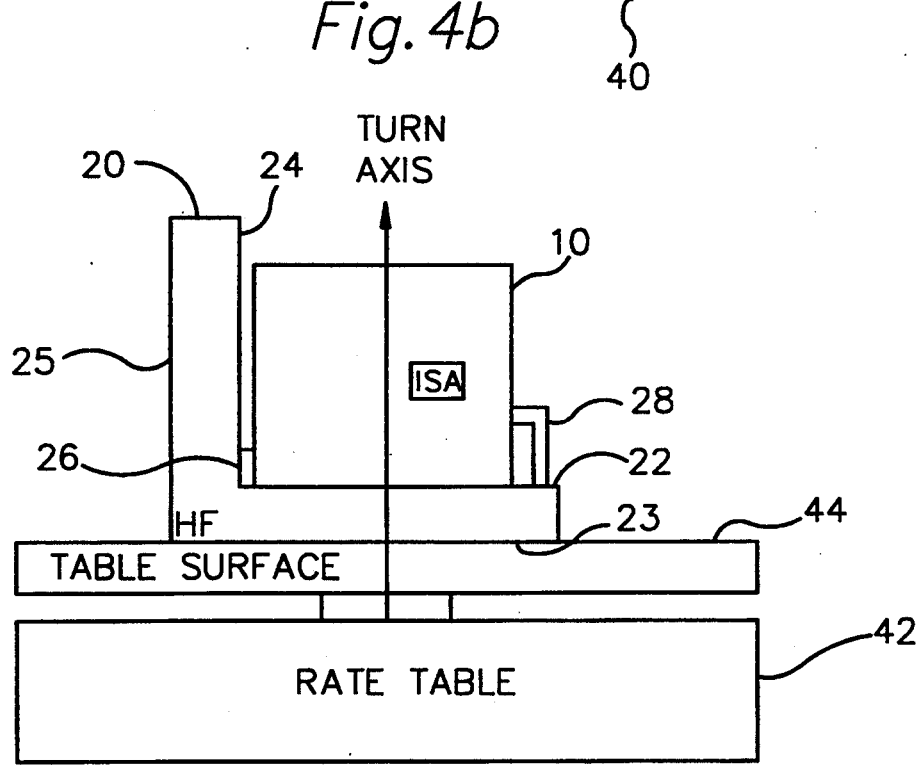

In FIGS. 4a and 4b, the calibration device 20 and the sensor assembly 10 are positioned on rate table surface 44. The rate table 40 employed in this calibration procedure is of the kind that is well known in the art. The rate table surface is perpendicular to the turn axis of the table in order to establish a turn axis which is perpendicular to either the primary or the secondary mounting surfaces depending on how the calibration device 20 is positioned on the rate table. Rotation of rate table surface 44 is driven by rate table motor 42.

The calibration procedure begins by positioning surface 23 against the table surface 44 as shown in FIG. 4a. If the table surface is perpendicular to the turn axis, and if the primary mounting surface 22 is parallel to surface 23, then the X-axis of the M-frame is parallel to the turn axis of the rate table. Rotation of the sensor assembly 10 about the turn axis establishes the X-axis of the sensor system in gyro coordinates. In the next step, the assembly is tested with surface 25 against the table surface 44 as shown on FIG. 4b. In this case, the turn axis is known to be perpendicular to the reference edge. This vector is also measured in gyro coordinates. The cross product of this vector with the previously determined X-axis produces a vector in gyro coordinates defined as the Y-axis. The Y-axis is parallel to the intersection of the primary and secondary reference surfaces, previously defined as the alignment reference line. The cross product of the X-axis with the Y-axis produces the Z-axis. This procedure produces the direction cosines of the M-frame axes, called X, Y, and Z, in gyro coordinates.

The accuracy of this method of calibration is controlled through the specifications of the rate table. On the better tables, nonorthogonality in the table surface is controlled to 5–10 $\mu$rad, typically. Machining of a flat parallel surface is well established technology with typical surfaces in the range of 50 $\mu$inch. For mounting feet spans of 6 inches, this would imply alignment errors in the range of 8 $\mu$rad. Surface cleanliness and the use of torque wrenches and careful installation procedures controls errors due to random obstructions on the mounting surfaces and compliance errors associated with tie down torques. It is especially important in this calibration procedure that all contact surfaces be clean and free of any obstructions. With a reasonable build up of tolerances, accuracy's in the range of 20 $\mu$rad are possible with somewhat larger values to be expected from most situations. This kind of performance compares well with optical techniques.

Figure 5:
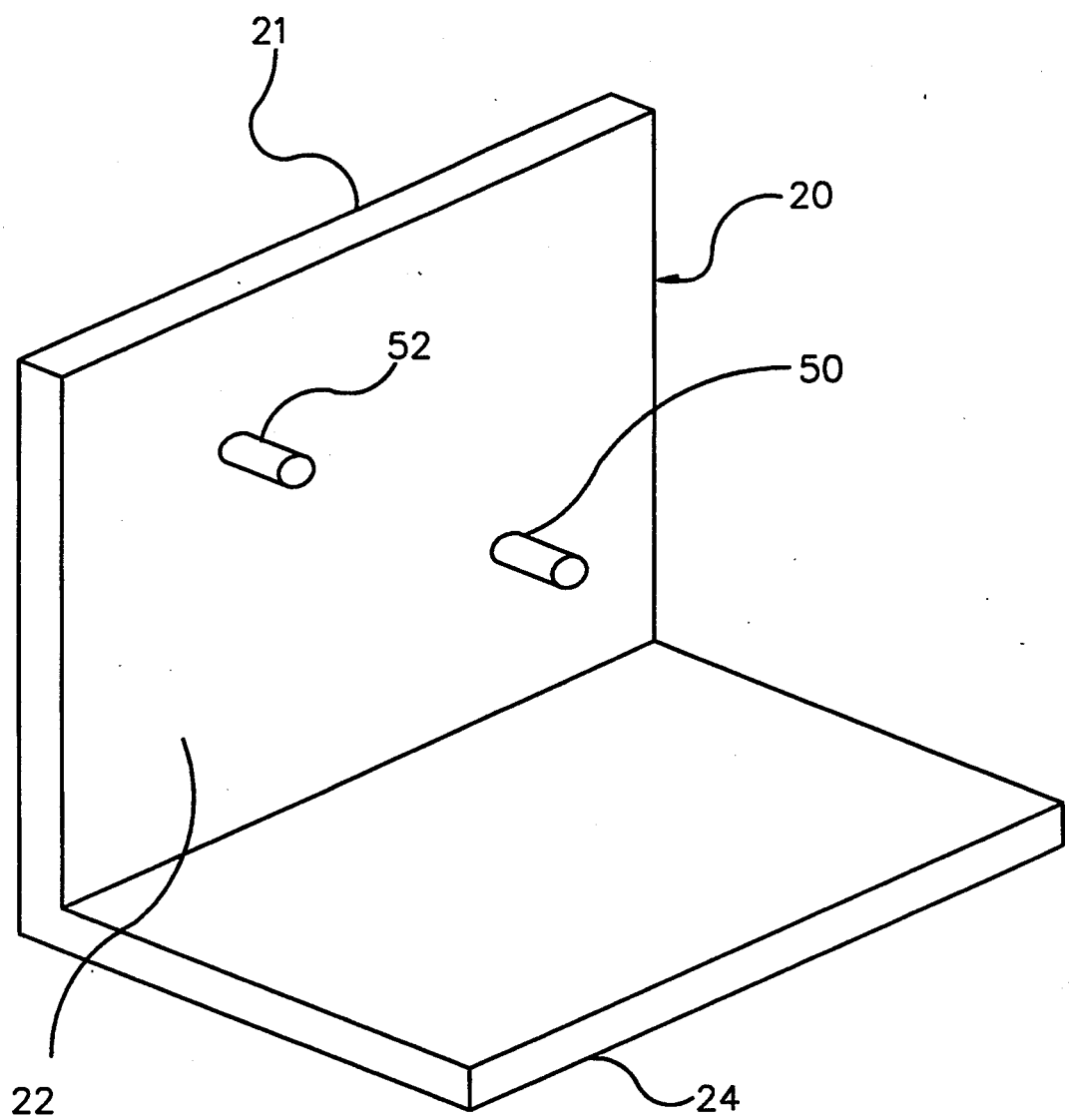
FIG. 5 is an isometric view of the second embodiment of the calibration device.
Figure 6A:
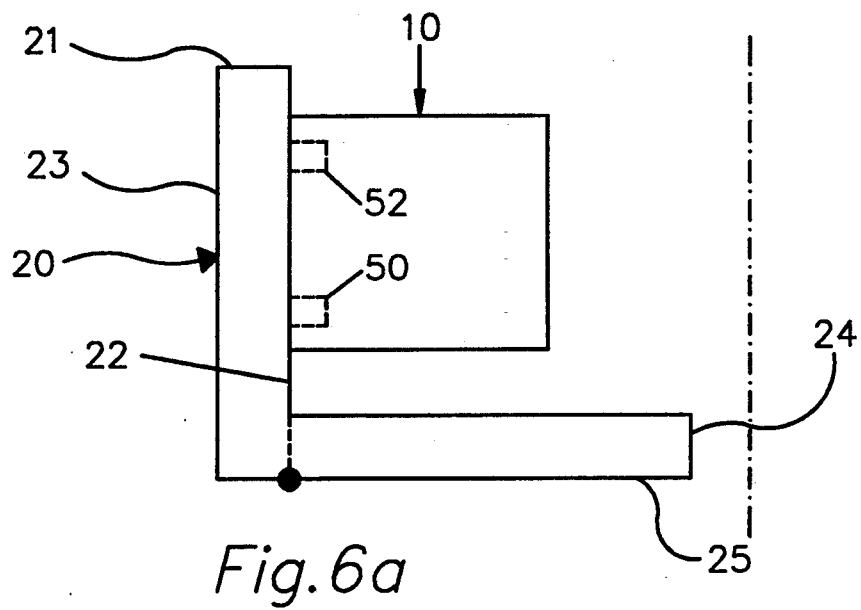
FIGS. 6a and 6b are views of the inertial sensor assembly mounted on the second embodiment of the calibration device.
Figure 6B:
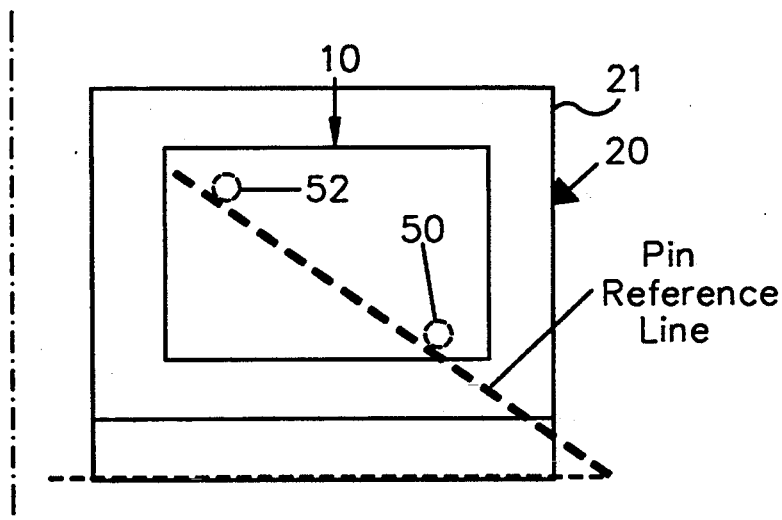

Another embodiment of the invention is shown in FIG. 5. As is seen, the reference edge points have been removed and alignment pins 50 and 52 have been positioned on the secondary mounting surface. For this embodiment of the invention a hole and slot combination are manufactured into the sensor assembly to receive pins 50 and 52. The sensor assembly 10 is installed on the calibration device 20 as shown in FIGS. 6a and 6b. The hole and slots fit over the pins when the sensor assembly is installed on the calibration device. As shown in FIG. 6b a line tangent to the alignment pins (called "pin reference line") can be measured relative to the alignment reference line (which is defined by the intersection of the primary and secondary reference surfaces). The angle between the pin reference line and the alignment reference line must be measured as a part of the building process of the calibration device. Once the sensor assembly 10 is mounted on the calibration device 20, the calibration procedure continues as was described above.

In yet another embodiment of the invention, the calibration device 20 is only used to establish the Y and Z axes. The X-axis for the inertial sensor system is provided through use of a simple flat plate. The inertial sensor assembly 10 is first mounted with enclosure reference surface 12 flush against the plate. The plate and assembly are then positioned on the rate table and rotated to establish the X-axis. The assembly is then mounted on the calibration device 20 and the Y and Z axes are established as was described above. One advantage of this embodiment is that surfaces 22 and 23 need no longer be parallel, thus simplifying the manufacture of the calibration device 20.

The calibration process described above is not limited to a particular configuration of the inertial sensor system. The process can be used for systems with one gyro or multiple gyros, and the system may or may not include accelerometers. Also, the present calibration system is not limited to calibration of one inertial sensor system at a time. During the calibration process, multiple inertial sensor assemblies can be mounted on the calibration device so that the exterior surfaces of the enclosures are oriented properly with respect to the reference surfaces on the calibration device. To accommodate more sensor assemblies, additional reference protrusions and reference edge forcing devices would be provided.

The foregoing is a description of a novel and nonobvious method and apparatus for calibrating an inertial sensor system. The applicant does not intend to limit the invention through the foregoing description, but instead to define the invention through the claims appended hereto.

I claim:

1. An inertial sensor system calibration apparatus for an inertial sensor system mounted within an enclosure, the enclosure having first and second planar reference surfaces, said calibration apparatus comprising:
   a rate table; and
   a calibration device comprising:
   a primary mounting member with a primary mounting surface that is substantially planar;
   a secondary mounting member positioned proximate to said primary mounting member, said secondary mounting member has a secondary mounting surface which is substantially planar and substantially perpendicular to the primary mounting surface;
   mounting means which fixes the enclosure on said primary and secondary mounting members so that the enclosure reference surface is flush against the primary mounting surface and a reference edge substantially parallel to the secondary mounting surface is established along the second reference surface; and
   means to position said primary and secondary mounting members on the rate table so that said first and second mounting members rotate about axes normal to the primary mounting surface and said secondary mounting surface.

2. The inertial sensor system calibration apparatus of claim 1 wherein the reference edge is established by a pair of reference protrusions which extend from the secondary mounting member and contact the second reference surface of the enclosure.

3. The inertial sensor system calibration apparatus of claim 1 wherein the means to position said enclosure on the rate table is comprised of:
   at least three points on said primary mounting member which define a first planar surface that is parallel to the primary mounting surface for rotation about an axis normal to the primary mounting surface; and
   said secondary mounting surface for rotation about an axis normal to the secondary mounting surface.

4. The inertial sensor system calibration apparatus of claim 3, wherein the primary and secondary mounting members are an integral one piece unit.

5. The inertial sensor system calibration apparatus of claim 2, wherein the pair of identical reference members extend from the second reference surface of the enclosure and contact the secondary mounting surface to establish the reference edge.

6. The inertial sensor system calibration apparatus of claim 1, wherein the mounting means are two reference pins on the first primary mounting surface which mate with a hole and slot in the enclosure reference surface and fixes the enclosure to said first and second mounting members.

7. The inertial sensor system calibration apparatus of claim 6, wherein the reference pins establish a line which is at a known angle with respect to the intersection of the primary and secondary mounting surfaces.

8. A method of calibrating an inertial sensor system comprising the steps of:
   mounting an inertial sensor system within an enclosure which has an exterior reference surface and a reference edge;
   providing primary and secondary planar mounting surfaces which are substantially perpendicular to each other;
   mounting the enclosure on the primary mounting surface with the reference surface flush against the primary mounting surface and the reference edge parallel to the intersection of the primary and secondary planar mounting surfaces;
   rotating said enclosure about an axis normal to said primary mounting surface to establish an X-axis for the inertial sensor system;
   rotating said enclosure about an axis normal to said secondary mounting surface to establish a directional vector;
   calculating the cross product of the directional vector and the X-axis to establish a Y-axis for the inertial sensor system; and
   calculating the cross product of the X-axis and the Y-axis to establish a Z-axis for the inertial sensor system.

9. The method of calibrating an inertial sensor system of claim 8, wherein rotation of the enclosure is performed by a rate table.

10. The method of calibrating an inertial sensor system of claim 8, wherein the X-axis is established by mounting the enclosure on a flat plate with the reference surface flush against the flat plate, and rotating the enclosure about an axis perpendicular to the flat plate.

* * * * *